United States Patent [19]

Sheng et al.

[11] 4,179,708
[45] Dec. 18, 1979

[54] OPTICAL PLAYBACK SYSTEM HAVING INCREASED DEPTH-OF-FIELD

[75] Inventors: Ping Sheng, Princeton; Arthur H. Firester, Skillman, both of N.J.

[73] Assignee: RCA Corporation, New York, N.Y.

[21] Appl. No.: 881,366

[22] Filed: Feb. 27, 1978

[51] Int. Cl.² .............................................. G11B 7/00
[52] U.S. Cl. .................................... 358/128; 358/127; 365/120
[58] Field of Search ............... 346/76 L, 108; 358/128, 358/127; 179/100.3 V; 365/124, 215, 120; 350/204

[56] References Cited

U.S. PATENT DOCUMENTS

| 3,547,526 | 12/1970 | Devereux | 350/204 X |
| 3,705,758 | 12/1972 | Haskal | 346/108 X |
| 3,919,562 | 11/1975 | Whitman | 179/100.3 V |

OTHER PUBLICATIONS

*The Axicon: A new type of optical element*, by John H. McLeod, vol. 44, p. 592, Aug. 1954.

Primary Examiner—Bernard Konick
Assistant Examiner—Donald McElheny Jr.
Attorney, Agent, or Firm—E. M. Whitacre; J. S. Tripoli; J. E. Roehling

[57] ABSTRACT

Recovery from a record of information recorded in an elongated information track comprising depressed areas alternating along the length of the track with relatively non-depressed areas, is effected by an optical playback system. The playback system employs means for illuminating a focusing lens with a light beam having a cross-section forming a closed band of light, such as an annulus, to thereby increase the depth-of-field of the resulting focused spot formed on the information track. Light detection means, responsive to light diffracted by the track provides an output signal representative of the recorded data.

8 Claims, 8 Drawing Figures

U.S. Patent     Dec. 18, 1979     4,179,708
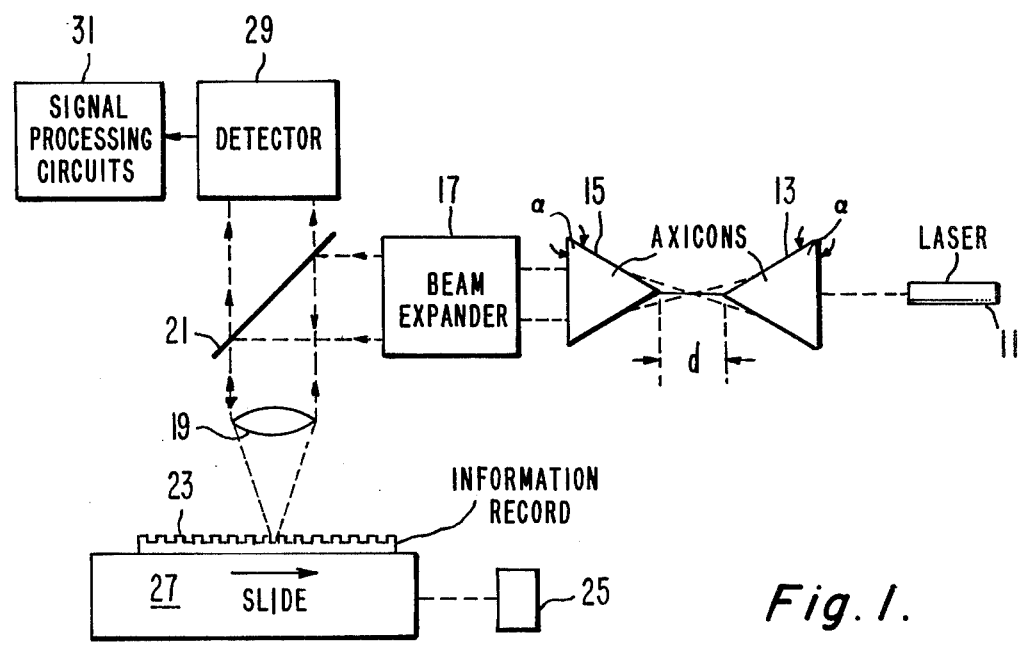
Fig. 1.
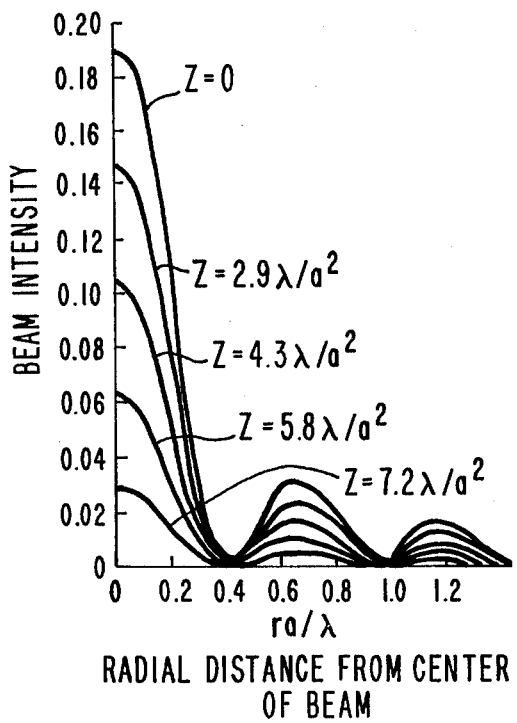
Fig. 2.
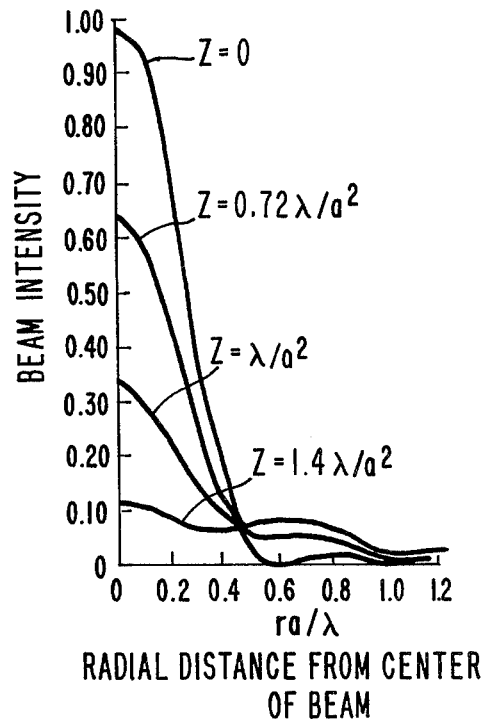
PRIOR ART Fig. 3.
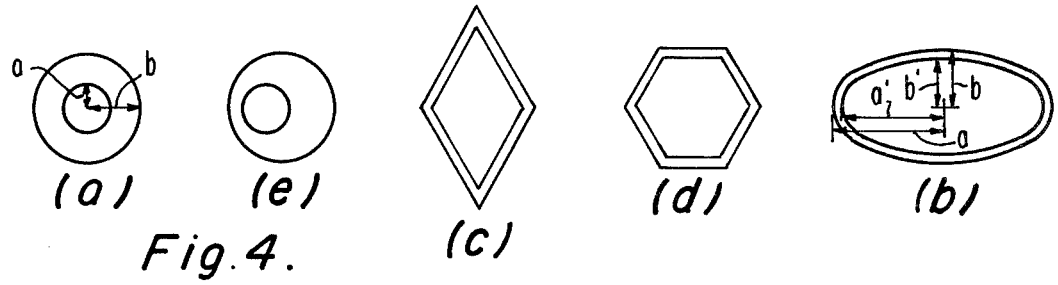
Fig. 4.

OPTICAL PLAYBACK SYSTEM HAVING INCREASED DEPTH-OF-FIELD

The present invention relates generally to novel light focusing techniques, and particularly to playback systems and optical focusing techniques therefor which may be employed to recover video information from the spiral track of a video disc record.

BACKGROUND OF THE INVENTION

In the prior art, optical systems have been disclosed, such as for example in U.S. Pat. No. 4,065,786, issued on Dec. 27, 1977 to W. C. Stewart, for directing light from a coherent light source upon an information track, formed as a succession of depressed areas of a given width alternating with non-depressed areas along the length of the track, with the light focused on the track as a spot having a half-intensity width (i.e., the dimension of the spot in a direction transverse to the length of the track, measured between half-intensity points) which is less than the track width (i.e., less than the given width of the depressed areas of the track).

The spot width choice of the aforementioned prior art systems is in contrast with the spot dimension employed in other prior art systems of the type exemplified by the arrangement described in the article entitled, "The Optical Scanning System of the Philips 'VLP' Record Player", by G. Boushuis and P. Burgstede, appearing at pages 186–189 of volume 33 of the Philips Technical Review (1973, No. 7). In the Philips arrangement, a circular light spot focused on the information track of a reflective video disc has a half intensity width which is greater than the width of the depressed areas of the information track by an amount sufficient to ensure that a significant portion of the incident light falls upon the adjoining "lands" (flat disc surface areas between adjacent track convolutions) when the spot is optimally centered upon a desired track convolution.

In either of the above-mentioned optical record playback systems the focused light spot provided at the record surface (i.e., the narrowest waist of a light beam) is commonly obtained at the focal plane of a focusing lens which has been illuminated by a monochromatic light beam (hereinafter referred to as full area illumination). This narrowest beam waist can be generally characterized as having a diameter at its half-intensity width of the size $\lambda/2a$, where $\lambda$ is the wavelength of the monochromatic beam and $a$ is the numerical aperture of the lens. The maximum axial deviation distance from the narrowest beam waist at which the beam waist still maintains its general dimensional characteristic is referred to as the depth-of-field and is equal to $\lambda/a^2$. It will be appreciated that during playback of an optical record it is desirable for satisfactory playback of recorded information to maintain deviations in the distance between the focusing lens and the record surface within a range of values determined by the aforesaid depth-of-field distance. It will be further appreciated that since the depth-of-field distance is directly related to the half-intensity width of the beam waist at the focal distance, difficulties in maintaining an appropriately focused spot on the record surface are increased with the decrease in spot size.

SUMMARY OF THE INVENTION

In accordance with the principles of the present invention, substantial increase in the depth-of-field distance, for an optical system employing a focused beam of light, is achieved by departing from the aforesaid full area illumination of the focusing lens. Instead, the focusing lens is illuminated with a "hollow" beam of coherent monochromatic light having a transverse cross-section forming a closed band of light with uniform phase across the width of the band. In order to preserve the half-intensity width of the narrowest beam waist formed by the focusing lens, the outer diameter of the band is made to correspond to the aperture of the lens. The ratio of the width of the band (assuming that it is uniform) to the outer radius of the band (assuming that the band is circular) is the adjustable parameter $q$ that can be reduced to obtain the desirable corresponding increase in the depth-of-field distance.

In accordance with one aspect of the present invention, the aforesaid closed band of light illumination requires that only a corresponding closed band area of the focusing lens surface be used. As a result, this illumination scheme is effectively insensitive to spherical aberrations of the focusing lens thereby enabling optical system design which successfully incorporates lower quality lenses without compromising overall system sensitivity.

In accordance with another aspect of the present invention, economies in the design of the detector of an optical record player, similar to the economies achieved with respect to focusing lens surface area utilized, can be achieved. The use of a detector having a closed band light sensitive surface corresponding to the closed band of light reflected off the record surface effects a reduction in detector capacitance relative to the detector capacitance of a detector having a full area aperture. This capacitance reduction which corresponds to $q(2-q)$ fraction of the full area aperture detector capacitance, can be advantageously employed, in a wide band detection system, to increase system load resistance and thereby provides an opportunity for increasing the signal-to-noise ratio of the signal information recovered during record playback by a factor of $1/\sqrt{q(2-q)}$.

In accordance with yet another aspect of the present invention, intermodulation distortion, during record playback, resulting from the overlap of the detection regions of simultaneously present plurality of recorded frequencies, when a full area illumination scheme is employed, is effectively reduced through the employment of the closed band illumination scheme of the present invention. Closed band illumination causes the different recorded frequencies present to have corresponding different detection regions thereby effectively reducing intermodulation distortion.

In using the closed band illumination scheme of the present invention, one foregoes the higher beam intensity level obtained at the focal plane through the employment of full area illumination (assuming that the respective beams are formed by comparable light sources and that no light is lost in the formation of the "hollow" beam). Additionally, the closed band illumination scheme may result in increased noise and decreased overall signal-to-noise ratio of the recovered information due to the ratio of detector regions contributing signal information to detector regions not contributing signal information which is smaller than the ratio of corresponding values in a full area illumination scheme. In the accompanying drawings:

BRIEF DESCRIPTION OF THE DRAWINGS

FIG. 1 provides partially in block diagram form a representation of an optical playback apparatus in accordance with one embodiment of the present invention;

FIG. 2 provides a graph of the relationship between the intensity profile of a focused beam, formed by the system of FIG. 1, as a function of beam radius at respectively different axial cross-sections of the beam;

FIG. 3 provides a graph of the relationship between the intensity profile of a focused beam, formed in accordance with prior art practices, as a function of beam diameter at respectively different axial cross-sections of the beam; and FIGS. 4a through e, respectively provide representations of cross-sections of beams which may be formed by the hollowing apparatus of FIG. 1, in accordance with the principles of the present invention.

DESCRIPTION OF THE PREFERRED EMBODIMENT

In FIG. 1, a laser source 11 provides a coherent light beam with a given half-intensity diameter (e.g., $2\gamma_o$, where $\gamma_o$ is the half intensity radius. The beam is transmitted through two similar conical axicons 13, 15 (i.e., hollowing apparatus) (e.g., glass cones of a type described in an article entitled "The Axicon: A New Type of Optical Element", by J. H. McLeod in the August, 1954 *Journal of the Optical Society of America*, Volume 44, Number 8, at page 596) placed apex-to-apex substantially as shown in FIG. 1. The distance d, between the respective apexes of the axicons 13 and 15 is chosen in a manner effecting the production of a beam having a cross-section, with uniform light phase thereacross, defining an annulus with a given q in accordance with the relation:

$$d = \frac{\gamma_o}{q(n-1)\tan\alpha};$$

provided that $n > 1$ and where $\alpha$ is the base angle of the respective axicons, and n is the index of refraction of the material of the axicons.

The beam is subsequently passed through a beam expander 17 so that the outer diameter of the cross-sectional annulus coincides with the aperture of a lens 19. The expanded beam is then reflected by a dichroic mirror 21 onto the entrance aperture of the lens 19 where it is focused on the surface of a record 23. The beam reflected off the surface of record 23 is effectively modulated in intensity by the signal information physically present on the surface of record 19 as relative motion is established through use of a suitable drive source 25 to effect translation of a slide 27 upon which the record 23 is supported. The reflected beam passes through both lens 19 and mirror 21 and is received by a photodetector 29. The intensity of light falling upon the photodetector 29 alternates between a minimum level and a maximum level in accordance with the modulation information present on the surface of record 23. The output of photodetector 29, will, therefore, comprise carrier waves with zero crossings at frequencies varying in consonance with the modulation information present on the record surface as it passes through the focused beam. The photodetector output is applied to appropriate signal processing circuits 31, for example of a type described in the aforementioned U.S. Pat. No. 4,065,786, to effect recovery of the signal information.

For a focused closed band annular illumination beam having a $q=0.1$, FIG. 2 graphically illustrates the intensity profile of cross-sections of the beam as a function of radial distance r from the beam center at different axial deviations z from the plane of the narrowest beam waist. The deviation z is expressed as a function of the numerical aperture a of the focusing lens. The intensity scale is calibrated such that 1.00 denotes the central intensity of a focused spot at the narrowest beam waist obtained by the conventional full area illumination of the lens. The calculation is done for the case where all the light in the full area illumination is now uniformly concentrated in the annular ring with a $q=0.1$, that is, where no light is lost. It should be apparent from the figure that although the intensity of the light spot decreases as z increases, the spot profile remains essentially unchanged up to $z = 5\lambda/a^2$ or even $7\lambda/a^2$. By way of contrast, FIG. 3 illustrates the intensity profile of a focused spot produced by a conventional full area illumination scheme. The intensity profile is shown as a function of the radial distance from the beam center at different axial deviations z from the plane of the narrowest beam waist. Again, the deviation z is expressed as a function of the numerical aperture a of the focusing lens and the intensity scale is normalized with respect to the central intensity of the focused spot at the narrowest beam waist. It is seen that at $z = \gamma/a^2$ the spot profile becomes smeared. Therefore, a gain in the depth of field of about a factor of five can be obtained by annular illumination with a $q=0.1$. However, also apparent from FIG. 2 is the fact that the gain in the depth of field is at the expense of the spot intensity. At the focal plane, the spot intensity for $q=0.1$ is about 1/5 of that obtained by full area illumination.

In FIG. 4a, a cross-sectional representation of a beam formed by the conical axicons of FIG. 1 is presented. Light illumination is present between radii a and b and the q of the beam is given by the expression:

$$q = (b-a)/b.$$

In FIG. 4b a cross-sectional representation of another beam in the shape of an "elliptical ring" which may be formed by a hollowing apparatus in accordance with the principles of the present invention is shown. During record playback, the major axis of the elliptical ring is oriented to be parallel to the direction of motion of the track of information of the record in order to preserve the resolution of signal elements at high spatial frequency. The boundaries of the elliptical ring can be described by two similar ellipses with major axes, a, a' and minor axes b, b' as indicated in the figure, where $a'/a = b'/b$. The q of the elliptical ring can be defined as $q = (a-a')/a$. For a given value of q, the elliptical ring has exactly the same gain in the depth of field as the annular ring.

In FIGS. 4c and 4d, two other examples of cross-sections of beams formed by a hollowing apparatus in accordance with principles of the present invention are shown as "polygonal rings". During record playback, one of the corners of the polygon is oriented so as to be aligned in the direction of motion of the track of information on the record for reasons similar to those discussed with reference to the elliptical ring representation.

FIG. 4e, illustrates another kind of variation in which an "annular ring" cross-section is provided with a non-uniform width.

To implement the capacitance reduction discussed above, in one embodiment of the present invention, the light sensitive surface of photodetector 29 in FIG. 1 corresponds to the cross-sectional shape of the light beam reflected off the record surface. The light beam reflected off the record surface and incident on the photodetector 29 has the same shape as the light beam output from the hollowing apparatus. Therefore, in this embodiment, the shape of the light sensitive surface of photodetector 29 corresponds to the cross-sectional shape of the light beam output of the hollowing apparatus.

For polygonal and elliptical rings, the advantage of being insensitive to the lens spherical abberation is lost to some extent. However, these non-annular illumination schemes may advantageously be employed in reading out information records with specialized signal element contours. Additionally, some measure of control over the detected frequency response can be realized through the employment of these non-annular illumination schemes by virtue of the control exercised over the relative dimensions of the segments of the closed band.

The implementation of various "elliptical" and "polygonal" closed band illumination schemes can be readily effected. For "polygonal rings" the conical axicons illustrated in FIG. 1 can be replaced by axicons (i.e. hollowing apparatus) which have the desired polygonal cross-sections. For "elliptical rings", the annulus which emerges from the conical axicons can be further compressed in one direction by using an anamorphic lens system. Finally, in order to obtain an "annular ring" with non-uniform width as shown in FIG. 4e, an elliptical stopper can be interposed between the conical axicons of FIG. 1 and the beam expander so that part of the annulus coming out of the axicons is blocked.

While the principles of the present invention have been illustrated in the context of a record playback apparatus, it will be appreciated that the same depth-of-field benefits which flow from the practices of the present invention are realizable when other optical systems employing focused beams of light embody the principles described above. One clear example of other systems to which the principles of the present invention might be profitably employed being optical recording systems. It will be appreciated, however, that focused spots formed by use of a non-annular illumination scheme, for recording purposes, will not have a significantly large field-of-depth relative to the field-of-depth obtained through use of full illumination schemes.

While this difference in results obtained, during information recording, between annular and non-annular illumination schemes is not fully understood, one plausible explanation is that during non-annular illumination regions on the focusing lens with differing apertures are illuminated. And while this is detrimental to the depth-of-filed of that part of the resulting focused spot formed by the smallest illuminated aperture, it is less of a critical factor during playback than during recording.

We claim:

1. In an optical playback system for retrieval of information recorded in the form of an elongated track on a surface of a record medium, said elongated track comprising a succession of depressed areas, of a given width, of a given depth and of variable lengths, alternating along the length of said track with relatively non-depressed areas; and apparatus comprising:
    means for providing a beam of coherent light;
    means for rendering a central portion of said beam substantially free of the light forming said beam, said rendering means providing a beam output having uniform light phase along transverse cross-sections thereof;
    means for focusing said beam output of said rendering means to a light spot near said surface of said recording medium;
    means for establishing relative motion between said elongated track and said focused light spot; and
    light detection means, responsive to light which interacted with said elongated track during the occurrence of said relative motion, for developing electrical signals representative of said recorded information.

2. Apparatus in accordance with claim 1 wherein said rendering means comprises:
    first and second means, positioned in the path of said beam, for transforming, with no appreciable loss of light, the light arrangement in a cross-section of the beam into a closed band of light arrangement.

3. Apparatus in accordance with claim 2 wherein said first and second means comprise axicons.

4. Apparatus in accordance with claim 2 wherein said first and second means comprise conical axicons.

5. Apparatus in accordance with claim 2 wherein said closed band of light is substantially annular in shape.

6. Apparatus in accordance with claim 7 wherein said closed band of light is substantially elliptical in shape.

7. Apparatus in accordance with claim 2 wherein said closed band of light is substantially polygonal in shape.

8. Apparatus in accordance with claim 1 wherein said light detection means comprises a light sensitive surface which corresponds in shape to a cross-section of the beam output of said rendering means.

* * * * *

UNITED STATES PATENT AND TRADEMARK OFFICE
CERTIFICATE OF CORRECTION

PATENT NO. : 4,179,708

DATED : December 18, 1979

INVENTOR(S) : Ping Sheng et al.

It is certified that error appears in the above-identified patent and that said Letters Patent is hereby corrected as shown below:

Column 6, line 46, the claim reference numeral "7" should read --2--.

Signed and Sealed this

Twenty-second Day of April 1980

[SEAL]

Attest:

SIDNEY A. DIAMOND

Attesting Officer  Commissioner of Patents and Trademarks